United States Patent [19]
Kano

[11] Patent Number: 5,408,363
[45] Date of Patent: Apr. 18, 1995

[54] REFLECTOR AND A METHOD OF GENERATING A REFLECTOR SHAPE

[76] Inventor: Tetsuhiro Kano, Untere Sandstrasse 30, Bamberg, Germany, 8600

[21] Appl. No.: 896,194

[22] Filed: Jun. 10, 1992

[30] Foreign Application Priority Data

Jun. 21, 1991 [EP] European Pat. Off. ............ 91110286

[51] Int. Cl.6 ............................ G02B 5/08; F21V 7/00
[52] U.S. Cl. ...................................... 359/869; 359/900; 362/346; 362/347; 362/350; 362/297; 362/304
[58] Field of Search .............. 359/850, 857, 867, 868, 359/869, 851, 852, 853, 900, 858; 362/296, 297, 298, 341, 346, 347, 350, 304

[56] References Cited

U.S. PATENT DOCUMENTS

| | | | |
|---|---|---|---|
| 2,759,106 | 8/1956 | Wolter | 359/858 |
| 2,819,404 | 1/1958 | Herrnring et al. | 359/858 |
| 3,443,086 | 5/1969 | Rikis | 359/858 |
| 3,774,995 | 11/1973 | Perret | 359/869 |
| 4,557,569 | 12/1985 | Hacskaylo | 359/869 |
| 4,730,240 | 3/1988 | van Meel et al. | |
| 4,945,455 | 7/1990 | Akizuki | 362/346 |
| 4,984,140 | 1/1991 | Ellion | |
| 4,990,788 | 2/1991 | Rabl et al. | 359/869 |
| 5,003,435 | 3/1991 | Nakata | 362/346 |
| 5,067,053 | 11/1991 | Akizuki | 359/347 |
| 5,136,491 | 8/1992 | Kano | 362/347 |

FOREIGN PATENT DOCUMENTS

| | | |
|---|---|---|
| 0307657 | 8/1988 | European Pat. Off. |
| 0371511 | 6/1990 | European Pat. Off. |
| 0402740 | 12/1990 | European Pat. Off. |
| 2634003 | 7/1988 | France |
| 159809 | 6/1983 | Germany |
| 3507143A1 | 3/1985 | Germany |
| 3744563A1 | 7/1988 | Germany |

Primary Examiner—Ricky D. Shafer
Attorney, Agent, or Firm—Brumbaugh, Graves, Donohue & Raymond

[57] ABSTRACT

A reflector for radiation disseminated by a radiation source is of a shape with which the reflector curve of intersection in a plane including an axis (A) of the reflector and the radiation source comprises segments (S1-A1, A2-B2) of different conics whose merging is edge-free. These conic segments are joined directly and the tangents at the point of contact (A1,A2) of two joined conic segments are alike. A method of generating such a reflector is indicated as well.

16 Claims, 8 Drawing Sheets

REFLECTOR AND A METHOD OF GENERATING A REFLECTOR SHAPE

The instant invention relates to a reflector for radiation disseminated by a source of radiation which reflector has such shape that a reflector curve of intersection in a plane including an axis of the reflector and the radiation source comprises segments of different conics whose merging is edge-free. The invention also relates to a method of generating reflector shapes.

The term "reflector" is to be understood broadly in the present context, referring not only to the reflection of optical rays (electromagnetic waves) but instead also to reflection in the entire range of the spectrum and to the reflection of other waves or rays, such as sound waves (especially with loudspeakers) shock waves (especially with lithotriptors for crushing stones in medicine) or the reception of electromagnetic waves (e.g. parabolic reflectors or dishes).

The reflectors in question serve the most varied purposes. For instance, it may be desirable to obtain great energy density at a desired distance from the reflector, or homogeneous energy distribution at a certain spacing from the reflector may be aimed at, or precise phase tuning may be the goal.

In addition to these diverse tasks to be fulfilled by reflectors it should also be kept in mind that, as a rule, certain marginal conditions are preestablished for reflectors, such as their dimensions and the angles of departure of the radiation sources.

In consideration of the different objects described above, it is clear that there is no optimum reflector shape suitable to solve all the problems universally. Instead, a suitable shape of the reflector must be developed for each particular case of application, depending on the particular object and the prevailing marginal conditions.

It is frequent practice in the art to associate radiation directive elements (such as lenses and the like) with the reflectors so as to achieve the desired distribution of radiation in the end. In other words, the imperfectness of the reflectors as regards radiation guidance or direction and distribution is overcome by additional structural components.

The instant invention is concerned with reflectors with which it is unnecessary to use additional elements for radiation shaping (lenses and the like), i.e. the reflector alone provides the desired radiation distribution.

The invention will be explained below with reference to reflectors for visible electromagnetic radiation (light). Yet the principles of the invention can be applied readily to other problems of reflection (e.g. to the guidance of shock waves in a lithotriptor).

The invention relates to the designing of reflector shapes with the aid of a computer. In principle, the radiation distribution resulting from any particular reflector can be calculated in advance by means of a computer. The use of computers is known in the art to determine reflector shapes. However, in the prior art the computer calculations are made on the basis of conic sections, briefly conics, and therefore are very much restricted. The invention presents novel reflector shapes which can be determined by means of a computer.

Quite generally, the following aspects (criteria) are essential in designing a reflector:

1. As the law that the incident angle equals the reflected angle applies in reflection, it would be desirable to construct a reflector such that the tangents to the individual locations of the reflector can be varied at will.

2. The total shape of the reflector should be smooth throughout, i.e. have no edges. "Free of edges" in this sense means that the curves are "steadily differentiable". Edges would cause bright rings (in case of rotationally symmetric reflector shapes) or bright stripes (in case of groove-like reflector shapes) to appear in the light spot. In this sense, therefore, "with edges" means that the tangent to a reflector curve of intersection including the central axis of the reflector does not vary continuously but instead irregularly. Any such irregular or sudden change causes rays to overlap which are reflected by the curve segments before and after the edge, thereby giving rise to the bright rings or stripes mentioned above which usually are not desired. Where edges protrude inside the reflector, dark rings and stripes may be formed.

3. To be able to determine the reflector radiation distribution in advance, the reflector shape must be defined in such manner that the distribution of radiation can be determined within the meaning of the first criterion above. Freely drawn curves cannot fulfill this condition.

In view of all those objectives, marginal conditions, and criteria of the most diverse nature mentioned above, it is not surprising that the prior art includes the biggest variety of proposals for the construction of reflectors and their shapes. The point of departure almost always is the conic section. Conic intersection lines have the advantage of being steady and defined by calculation so that the radiation distribution can be determined in simple manner. However, conics (being lines of intersection through the reflector) have the disadvantage that the tangents to the individual points of the reflector cannot be varied, as may be required. Instead, the tangents are firmly established to begin with. For instance, the tangent which can be drawn to a parabola changes throughout the course of the parabola such that radiation emitted by the focus is reflected parallel to the optical axis. These reflection characteristics of reflectors of the shape of conic sections cannot be altered by varying the conic parameters.

One of the most important and, at the same time, most difficult problems with reflectors is the establishing of a homogeneous radiation distribution (distribution of light) by means of the shape of the reflector alone (i.e. without additional means of assistance). None of the known conic lines of intersection can solve this problem.

A very complicated approach for a motor vehicle headlight is to be found in DE 37 44 563 A1. It has part of the reflector designed as a paraboloid, while a central portion follows a very complicated mathematical function, and the transition between different portions is said to be of steadily differentiable type of design.

DE 35 07 143 teaches the lining up of segments of different conics, with the problem of the transition between different segments remaining unresolved. In other words, edges continue to be present.

In U.S. Pat. No. 4,730,240 an attempt is made at avoiding such edges between different parabolic segments by designing the transition between segments smoothly. Yet that does not solve the problem of the transition in general. Instead, specific tables of coordinates are indicated expressly for the particular case. Thus it was not described how the transitional curve can be determined by calculation. Consequently this piece of prior art does not fulfill the third criterion mentioned above and, besides, the known reflector design is extremely costly.

European patent application 0 402 740A2 (cf. also U.S. patent appl. 07/536,423, issued Aug. 4, 1992 as U.S. Pat. No. 5,136,491) (by the inventor of the instant application) teaches a method of generating different reflector shapes which are not conic lines of intersection. The reflector curves of intersection of these known reflector shapes do fulfill the three criteria listed above and, therefore, permit a reflector to be constructed whose light distribution can be determined in advance, i.e. a reflector which does not require any experiments to be carried out in order to precisely determine the distribution of radiation.

The known method mentioned above for generating a reflector shape has the disadvantage that it is quite time consuming. Moreover, it would appear that it can be improved further in respect of greater variability of construction.

It is, therefore, an object of the instant invention to provide a radiation reflector and a method of generating a reflector shape which both permit radiation distribution in a desired manner without any additional means to guide the rays. It is also an object of the invention to provide a method as specified which is applicable in the greatest possible number of ways and easy to be reduced to practice.

The invention will be described further, by way of example, with reference to the accompanying drawings, in which.

Figure 6:
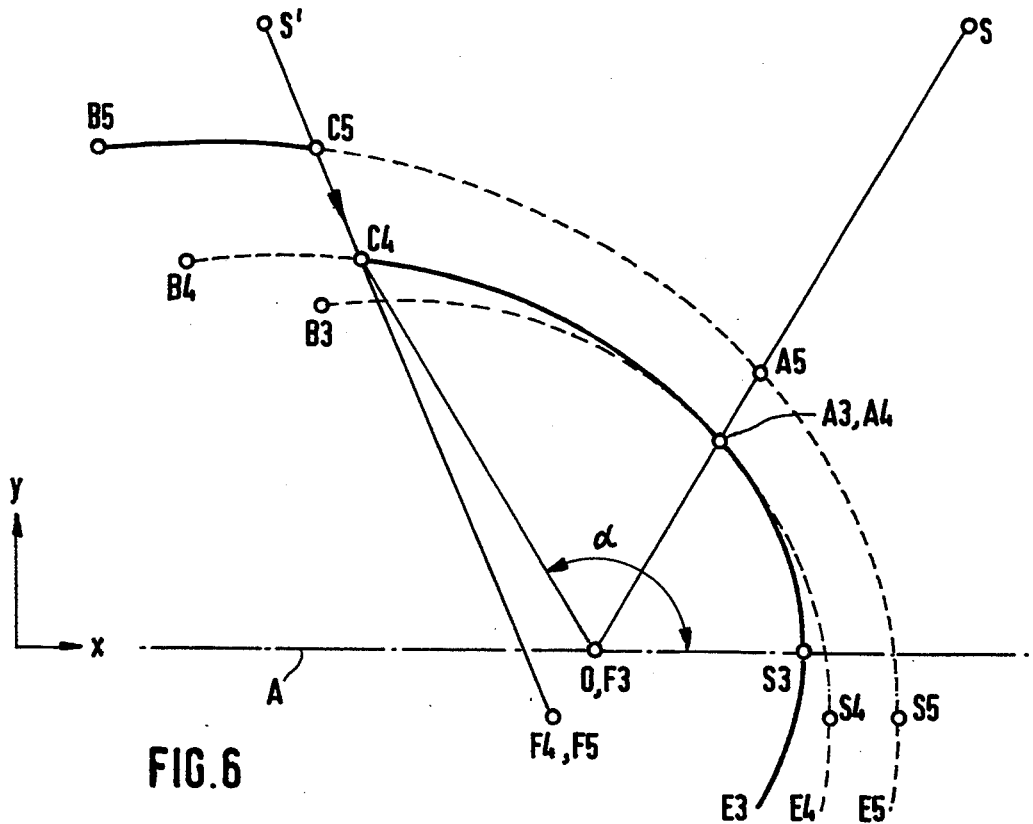
Figure 7:
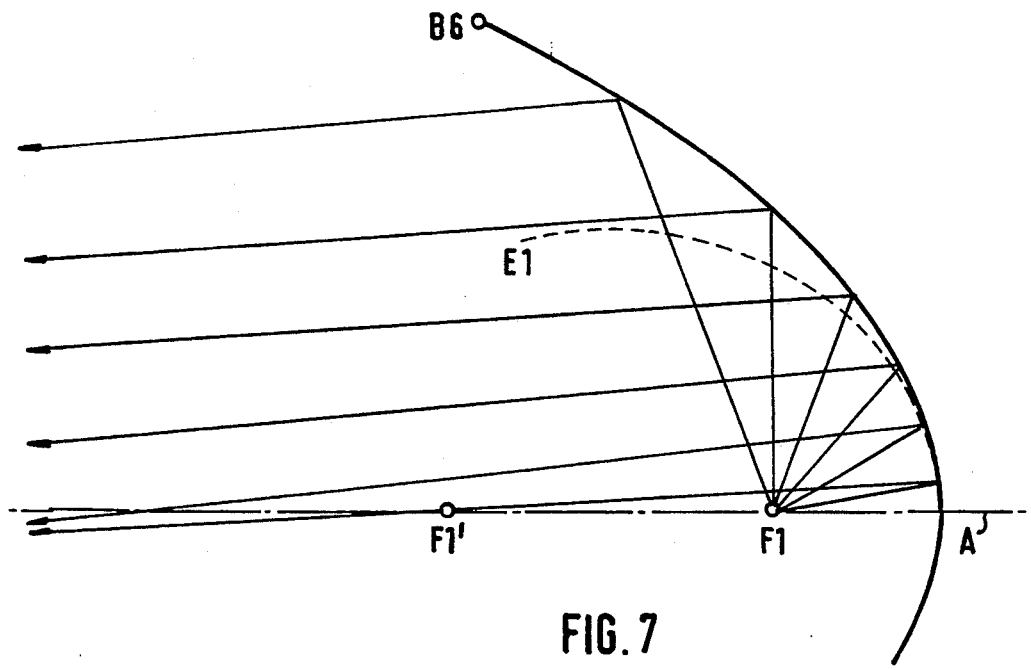
Figure 8:
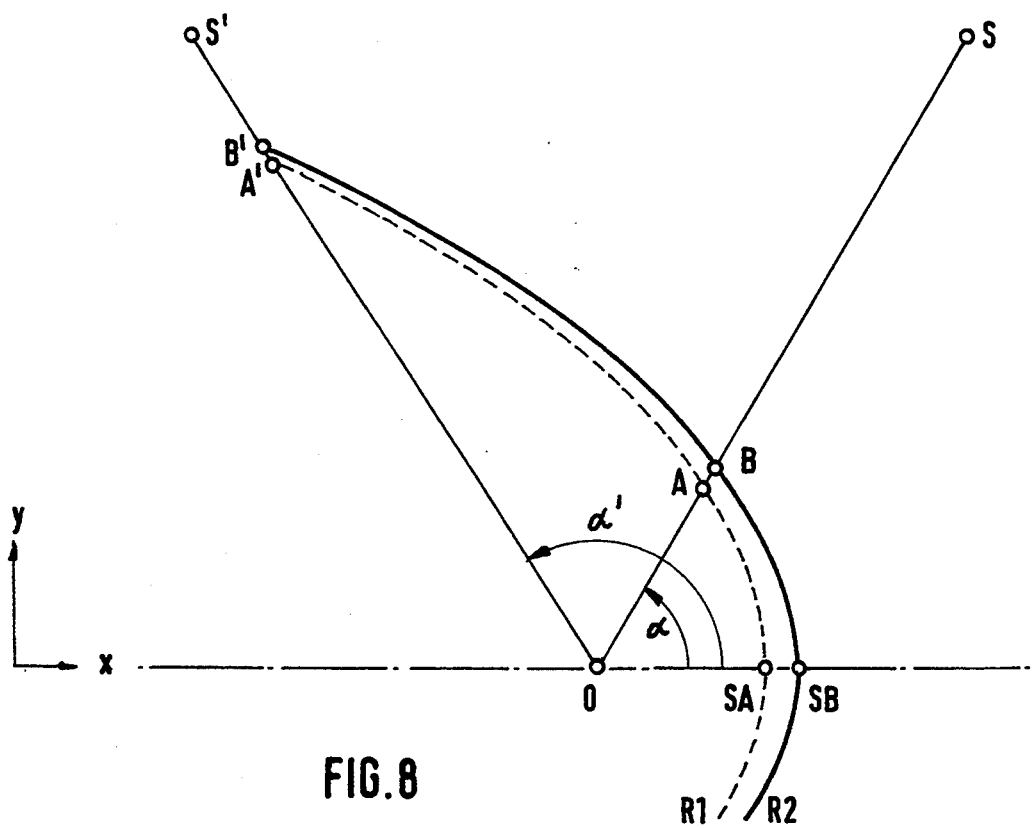
Figure 9:
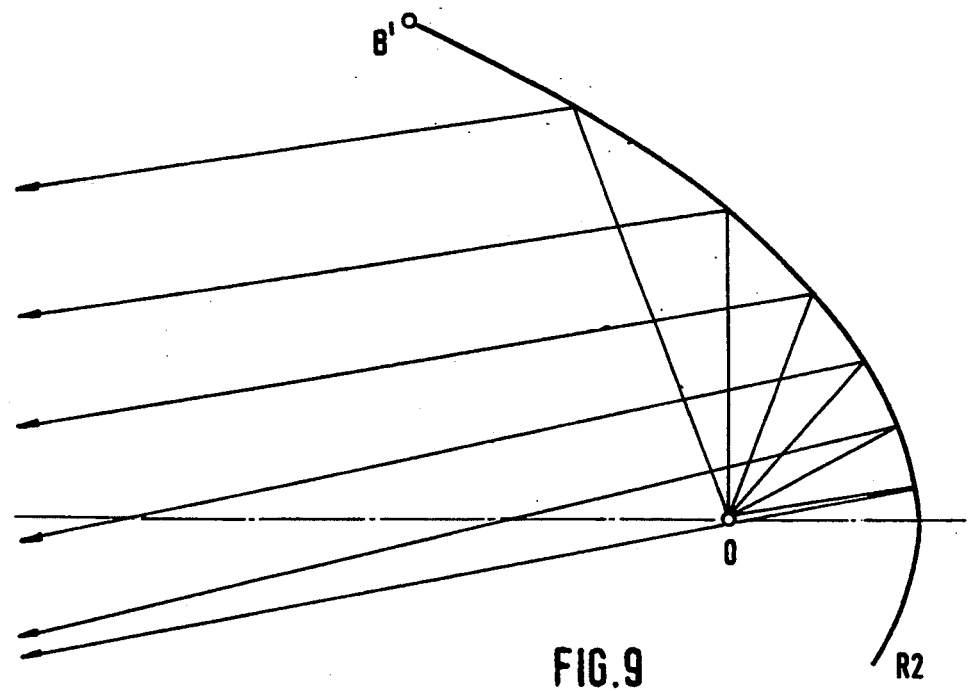
Figure 10:
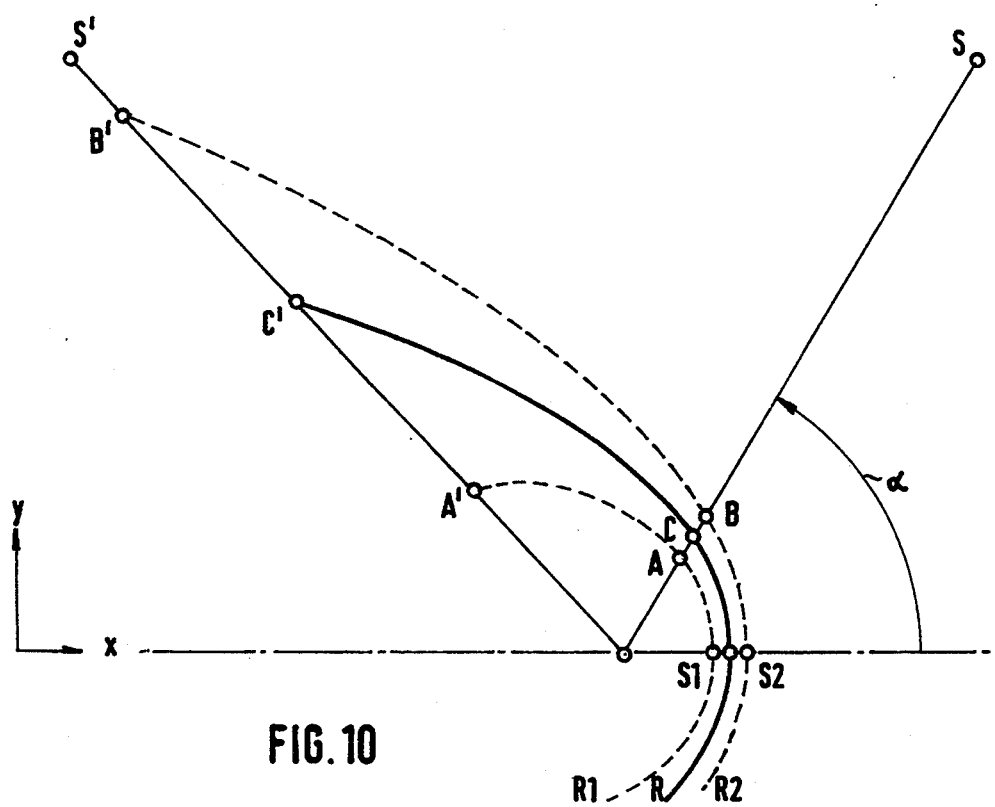
Figure 11:
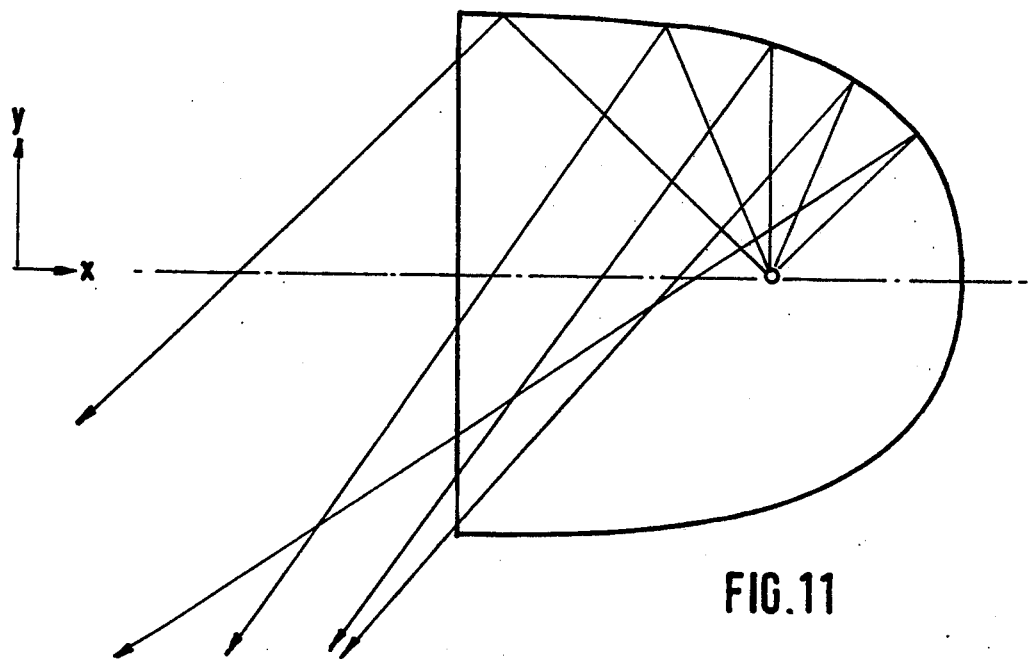
Figure 12:
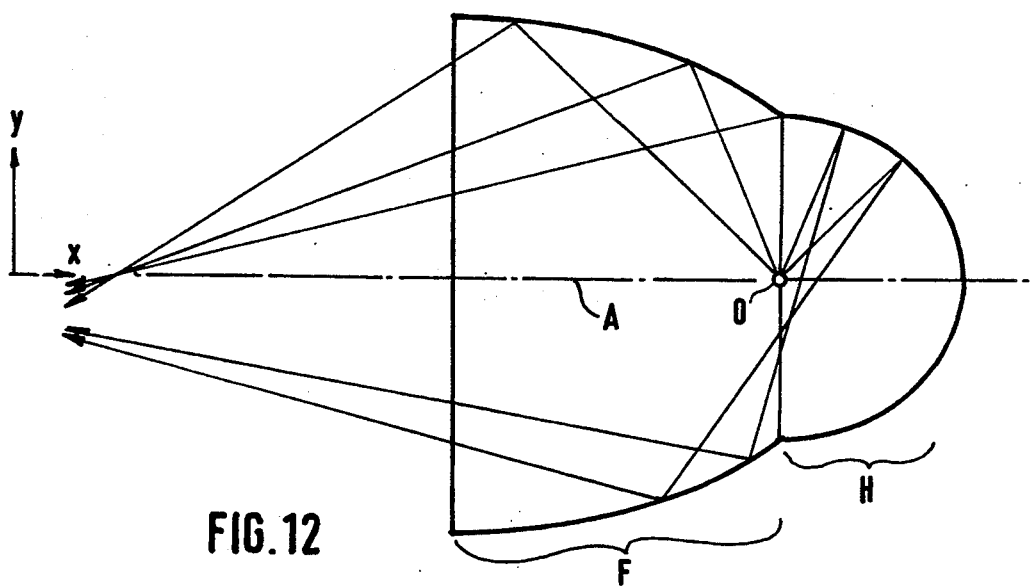
Figure 13:
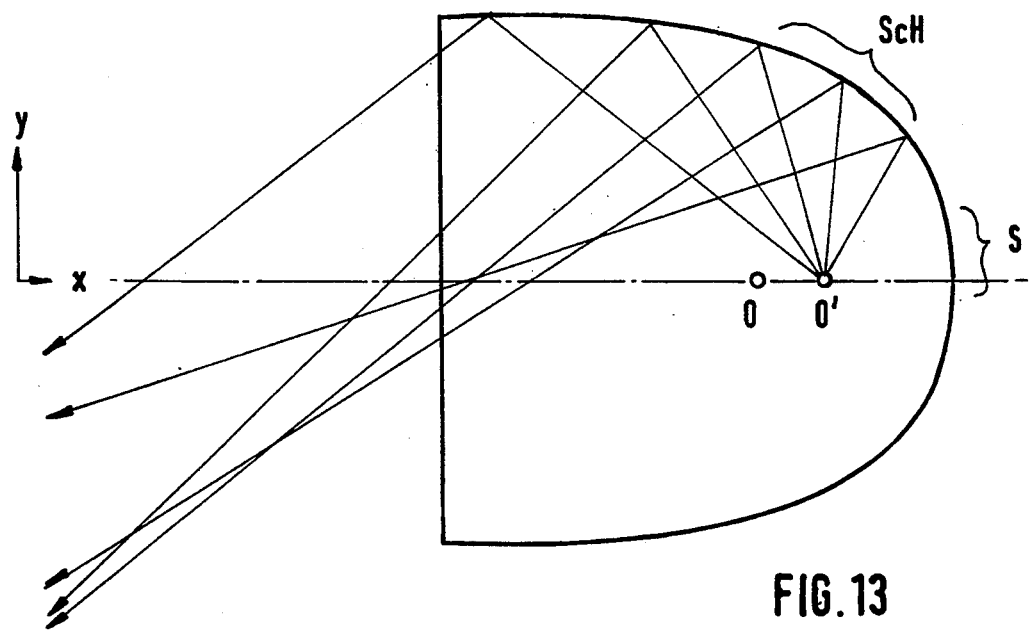
Figure 14:
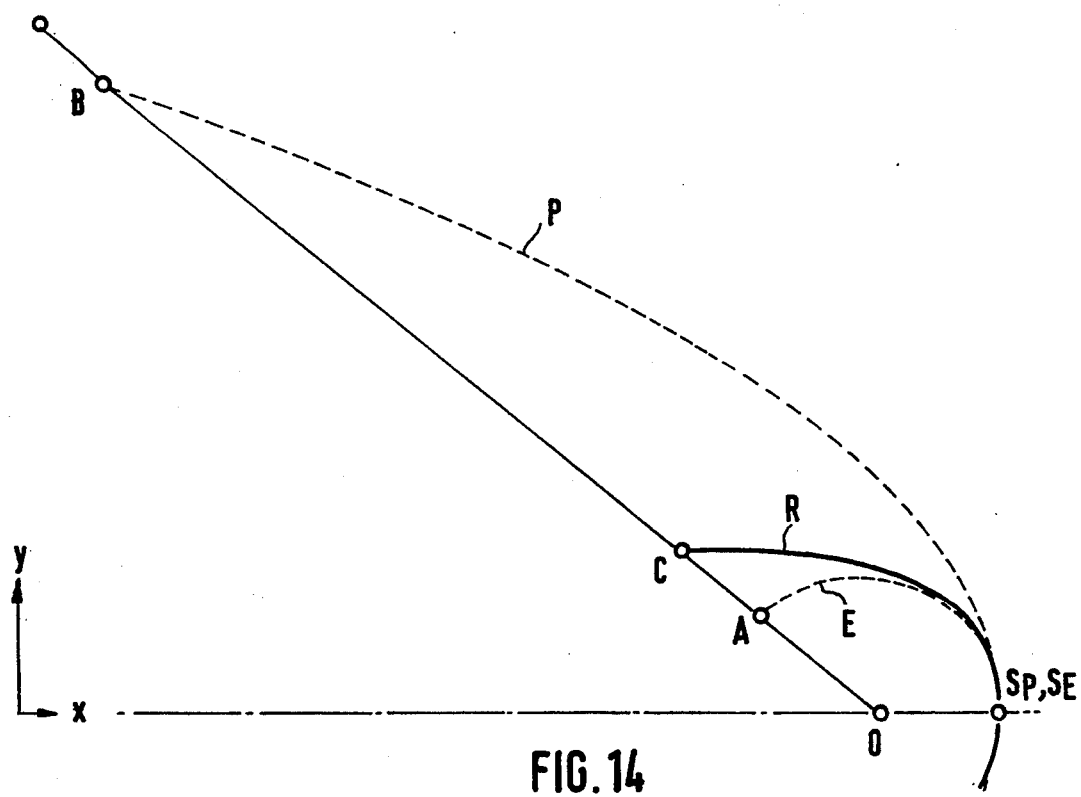

FIG. 6 presents another construction of a reflector curve of intersection;

FIG. 7 illustrates radiation distribution obtained with a reflector constructed according to the invention;

FIG. 8 illustrates another embodiment of generating a reflector curve of intersection;

FIG. 9 illustrates radiation distribution obtained with a reflector generated according to the invention;

FIG. 10 presents another embodiment of the construction of a reflector curve of intersection;

FIG. 11 illustrates radiation distribution obtained with a reflector constructed according to the invention;

FIG. 12 shows a known reflector shape;

FIG. 13 shows another embodiment of a reflector curve of intersection;

FIG. 14 shows another embodiment of a reflector curve of intersection; and

Figure 15:
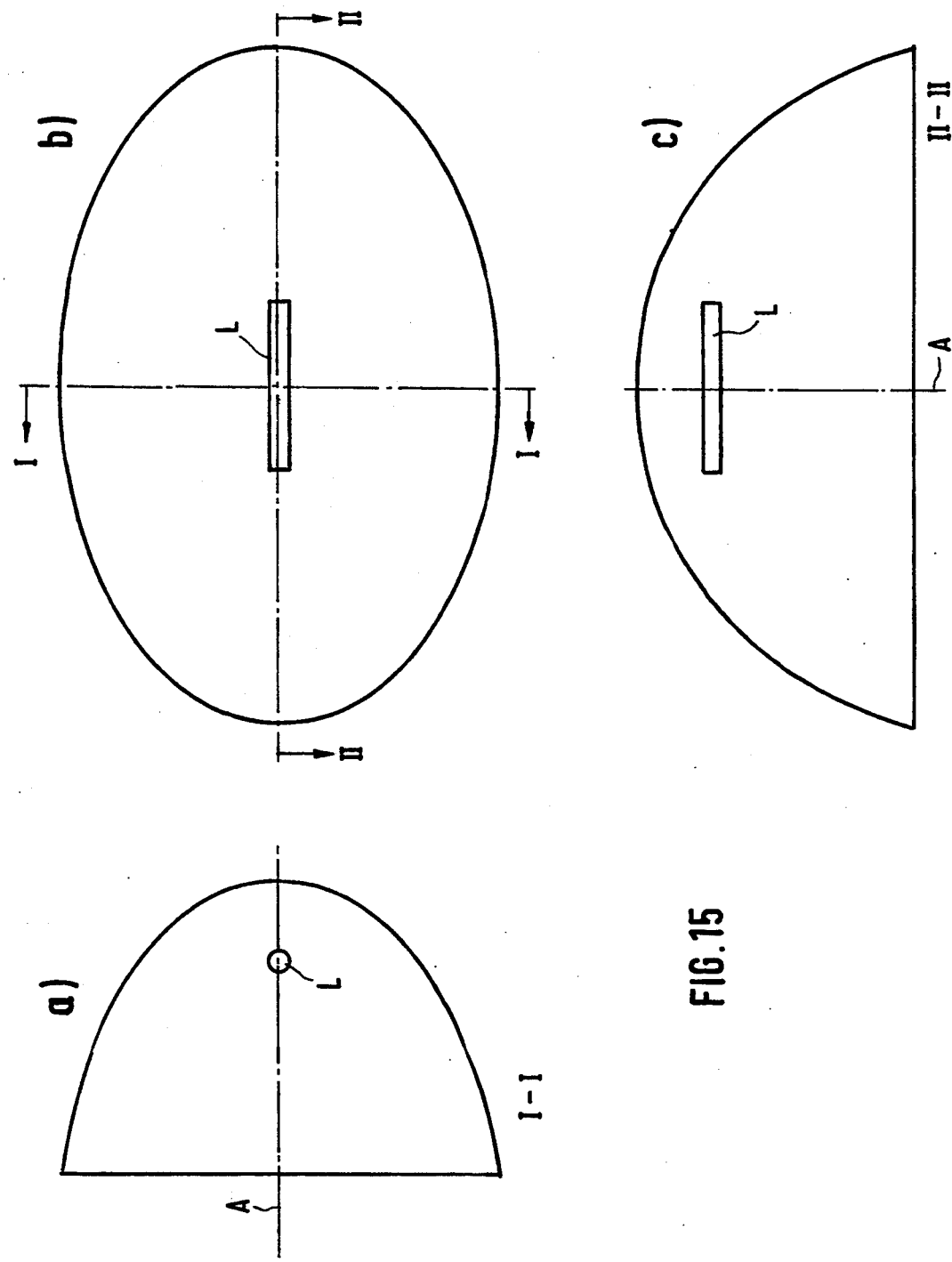

FIG. 15($a$–$c$) illustrates a reflector which is not rotationally symmetric.

Figure 1:
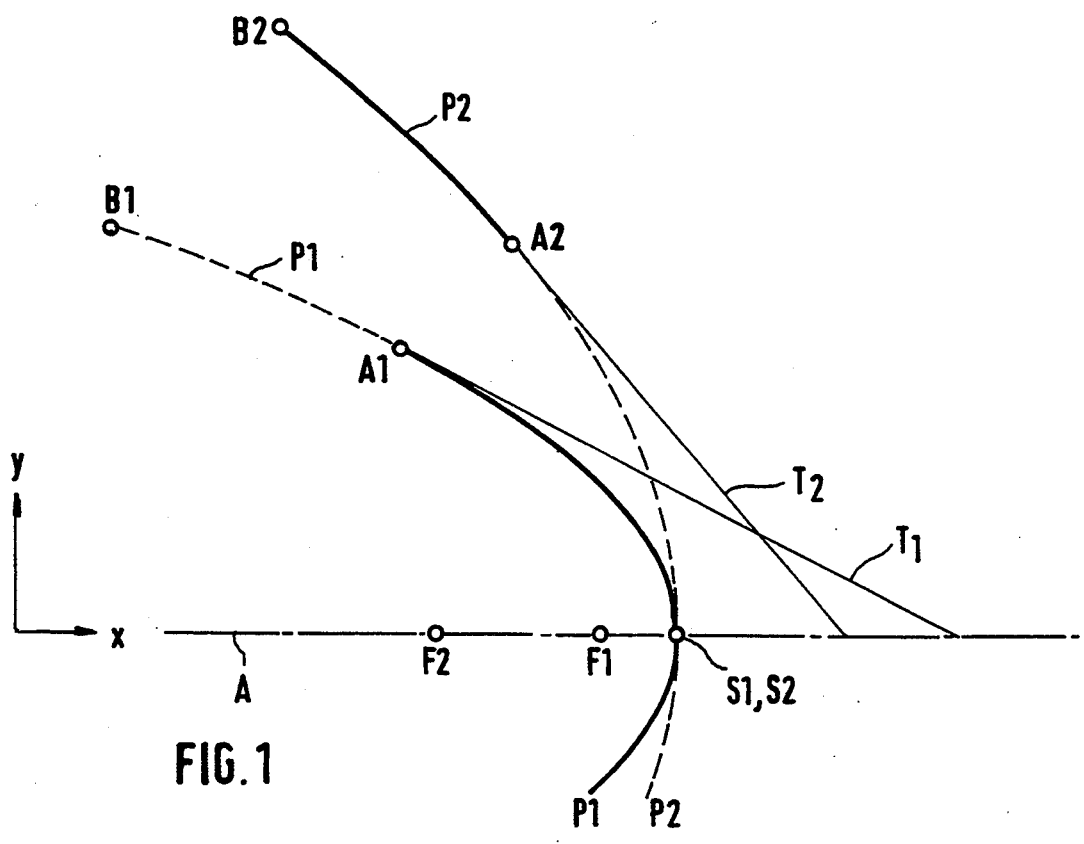
FIG. 1 shows two parabolas by means of which a reflector shape is generated as illustrated in FIG. 2.

FIG. 1 presents a first example of the construction of a reflector shape by means of a reflector curve of intersection. The reflector curve of intersection represents a cut through the reflector in a plane which includes both an axis A of the reflector and a radiation source (not shown). The radiation source is arranged in the usual manner close to or at the focus of the conics which generate the reflector curve of intersection. In the figures, various points of interest on the curves shown are each designated by a letter and a figure. Each figure indicates the association of a particular point with a certain conic, while the letters serve to distinguish various points of the conic.

The conics presented in FIG. 1 are two parabolas P1, P2 and their corresponding foci F1 and F2, respectively. The apices S1, S2 of the two parabolas lie together on the optical axis A.

Figure 2:
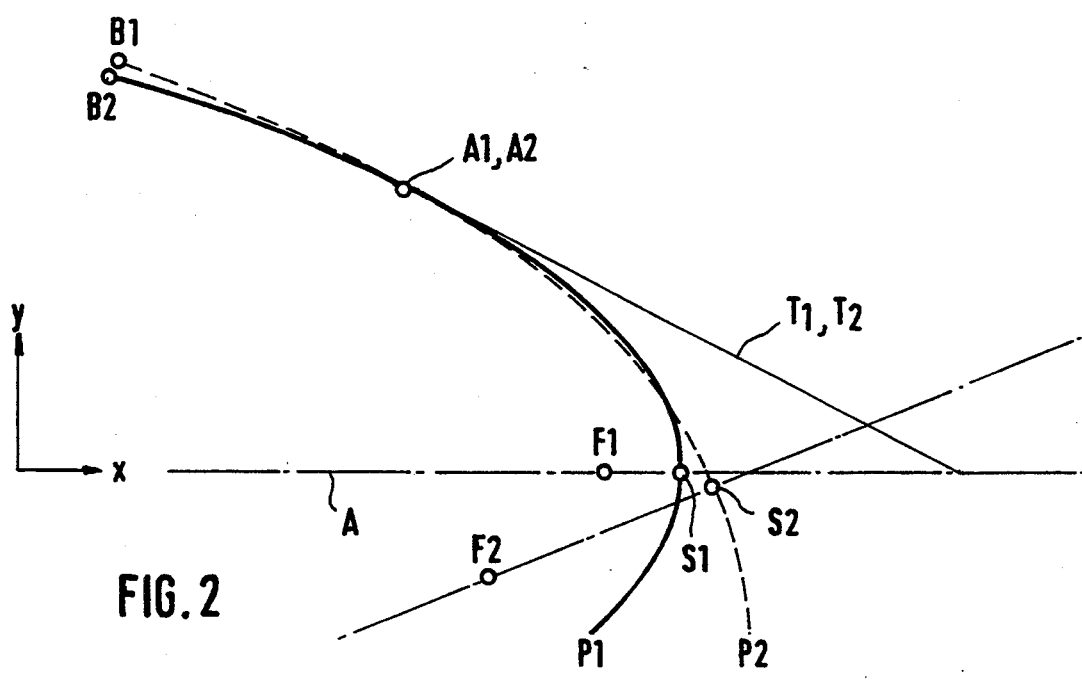
FIG. 2 shows a reflector shape in a curve of intersection.

The construction of the reflector shape first starts from the parabola P1 which has been conveniently selected for the illumination problem to be solved but which, as such, does not yet provide a satisfactory distribution of light. The light distribution afforded by a reflector shape according to parabola P1 demonstrates that the reflection angles (corresponding to the tangent) should be changed especially in the outer range (marginal zone) of the reflector. It is the purpose of a second parabola P2 to cause that change of the reflector curve of intersection such that it will differ from parabola P1 outside of point A1. On the first parabola P1, a point A1 is determined from which on (as seen from the apex S1) the reflector curve of intersection should be altered. The distance from A1 to B1 of parabola P1 is to be replaced by another conic segment, namely segment A2 to B2 of parabola P2. To make this replacement, first the tangent T1 to point A1 on parabola P1 and the tangent T2 to point A2 on parabola P2 are determined. The tangents T1, T2 each intersect axis A at a certain angle. First the tangents are moved into parallel alignment. To accomplish that, the segment A2-B2 of parabola P2 is rotated about point A2 until tangent T2 lies parallel to tangent T1. Thereupon the segment A2-B2 is displaced by translatory movement until point A2 coincides with point A1. This is illustrated in FIG. 2. The segments which are shown as continuous lines, namely S1-A1 and A2-B2, now are directly contiguous, i.e. there is no transitory piece between the conic segments. The result is a reflector curve of intersection S1-A1/A2-B2 (shown in continuous line in FIG. 2) made up, without any gaps, of conic segments from different conics which merge steadily differentiably into each other. This means that at the point of contact A1,A2 the tangents to be drawn from both directions are the same. The radiation distribution of a relector made in accordance with the reflector curve of intersection of FIG. 2 can be determined completely since the tangent to each point of the reflector surface is known and, therefore, the angles of incidence and reflection are known.

In the case of the reflector shape shown in FIG. 2 radiation emitted from focus F1 can be slightly reflected inwardly (as compared to parabola P1) in the marginal zone of the reflector, while it is reflected parallel to the optical axis A in the central area. Hereby the reflector curve S1-A1/A2-B2 can form a smaller light spot than the reflector curve S1-A1-B1. No great inhomogeneity (bright ring) results in the light spot.

Figure 3:
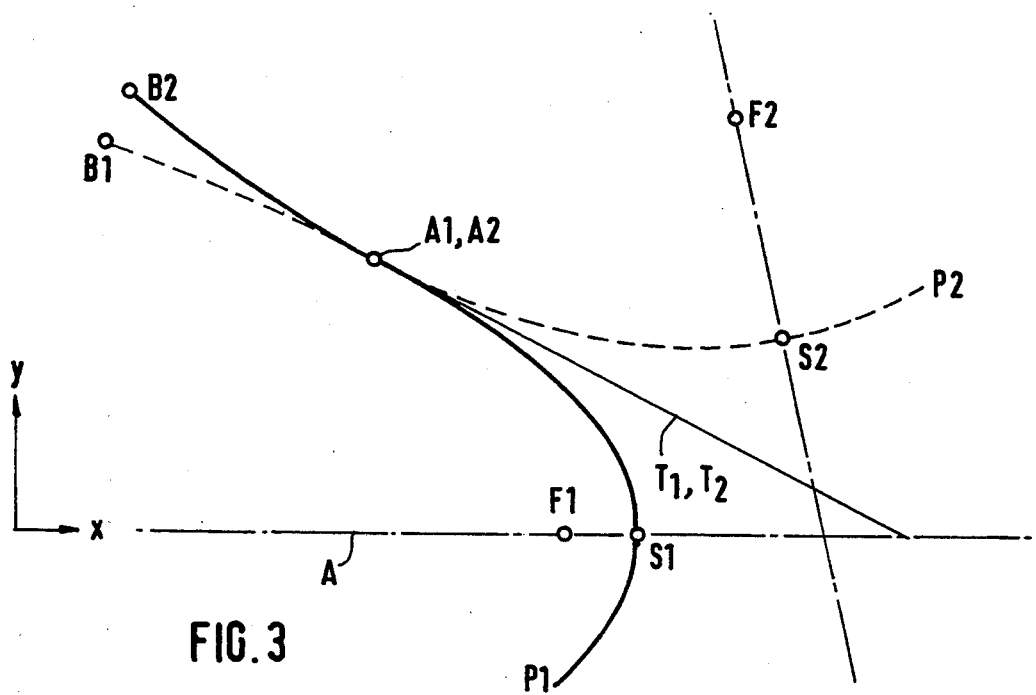
FIG. 3 shows another embodiment of a reflector curve of intersection.

FIG. 3 illustrates a modification of the embodiment according to FIG. 2 with which a parabolic segment A2-B2 is added at point A1, having a direction of curvature which is inverse as compared to the example of FIG. 2. The point of connection A1/A2 is a point of inflexion. The reflector composed of the reflector curve of intersection S1-A1/A2-B2 reflects incident radiation in the area of its edge more outwardly, as compared to the embodiment illustrated in FIG. 2, so that the light spot is enlarged.

With this embodiment, too, the tangents of all the participating conic section curves can be determined by calculation so that the distribution of radiation can be determined in advance. The method illustrated can be applied to combine different conic segments of different types of conics directly with each other, for instance, segments of parabolas can be united with segments of ellipses.

Rotation about axis A, for example, or translatory shifting of the curves in a direction perpendicular to the plane of the paper (groove-type reflector) will provide full reflector shapes of the reflector curves of intersection thus formed.

Figure 4:
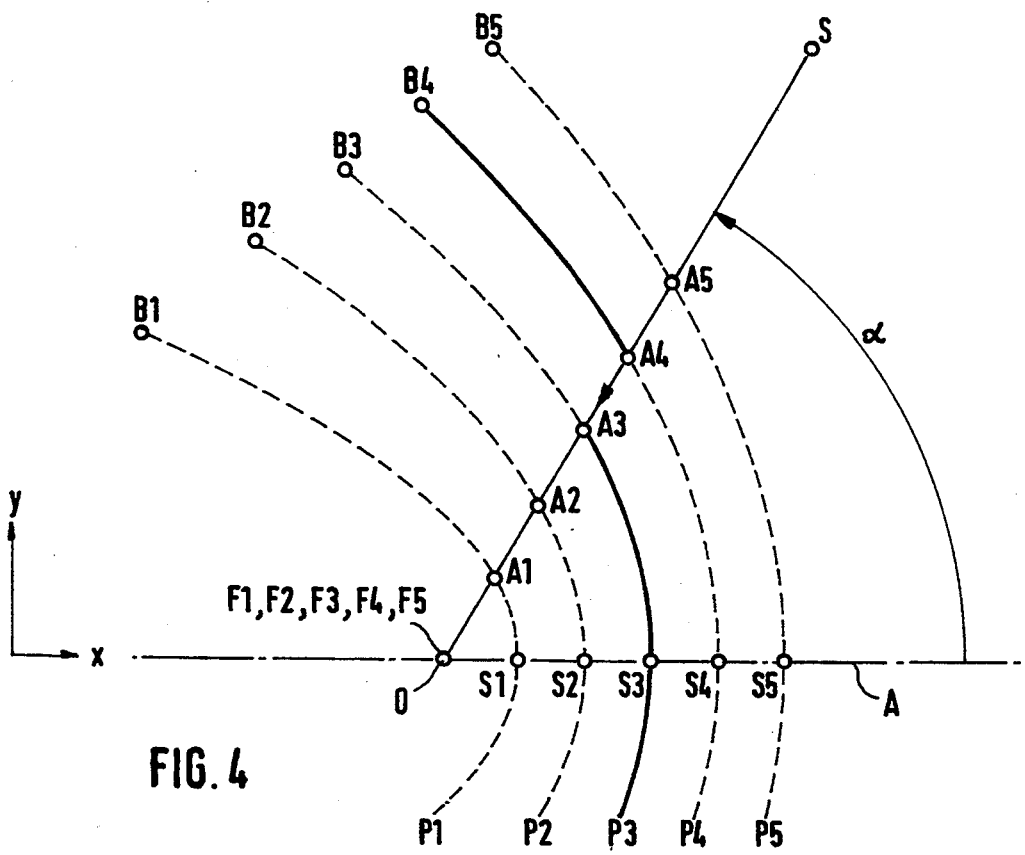
FIG. 4 is a presentation of a particularly simple construction of a reflector curve of intersection with the aid of parabolas.

FIG. 4 illustrates a method by which reflector curves of intersection of the kind described above can be obtained in a particularly simple way. Thus a plurality of parabolas P1, P2, P3, P4, and P5 are arranged with respect to a common axis A according to FIG. 4 such that their foci F1, F2, F3, F4, and F5 coincide. This common focus at the same time constitutes the origin 0 of a system of polar coordinates. FIG. 4 shows a straight line 0-S starting from the 0-point of the system of polar coordinates. The polar angle is designated α. If one assembles the parabolas in this manner the polar straight line 0-S intersects the parabolas at points A1, A2, A3, A4, and A5. The tangents drawn to the parabolas at these points all are parallel to one another. This simplifies the joining of the conic segments, as compared to the embodiments illustrated in FIGS. 1 and 2, because the particular segment to be joined need not be rotated. For example, all that is required if the parabolic segments S3-A3 and A4-B4 are to be united directly is translatory shifting of the segment A4-B4 until point A4 on the straight line 0-S is moved to coincide with point A3, as indicated by an arrow in FIG. 4. At the point of contact of the various segments of the reflector curve of intersection thus formed, i.e. at point A3/A4 the tangents are identical, as desired.

Upon rotation about axis A (or translatory displacement to yield a groove-type reflector) a reflector curve of intersection formed as described above will define a reflector which differs from a paraboloid reflector according to section curve S3-A3-B3 in that the radiation is slightly reflected outwardly in the area of its edge.

On the other hand, if the radiation in the marginal zone of the reflector is to be reflected more towards the inside then, for instance, curve segment A1-B1 is shifted along the polar straight line 0-S (or segment A2-B2 if the inward reflection is to be less pronounced), in analogy to the previously described embodiment, until point A1 comes to lie on point A3. In this manner, the most diverse reflector shapes can be generated easily, and their light distribution is precisely determinable in advance.

The embodiment described above with reference to parabolas is applicable analogously to circles which likewise are conic sections.

Figure 5:
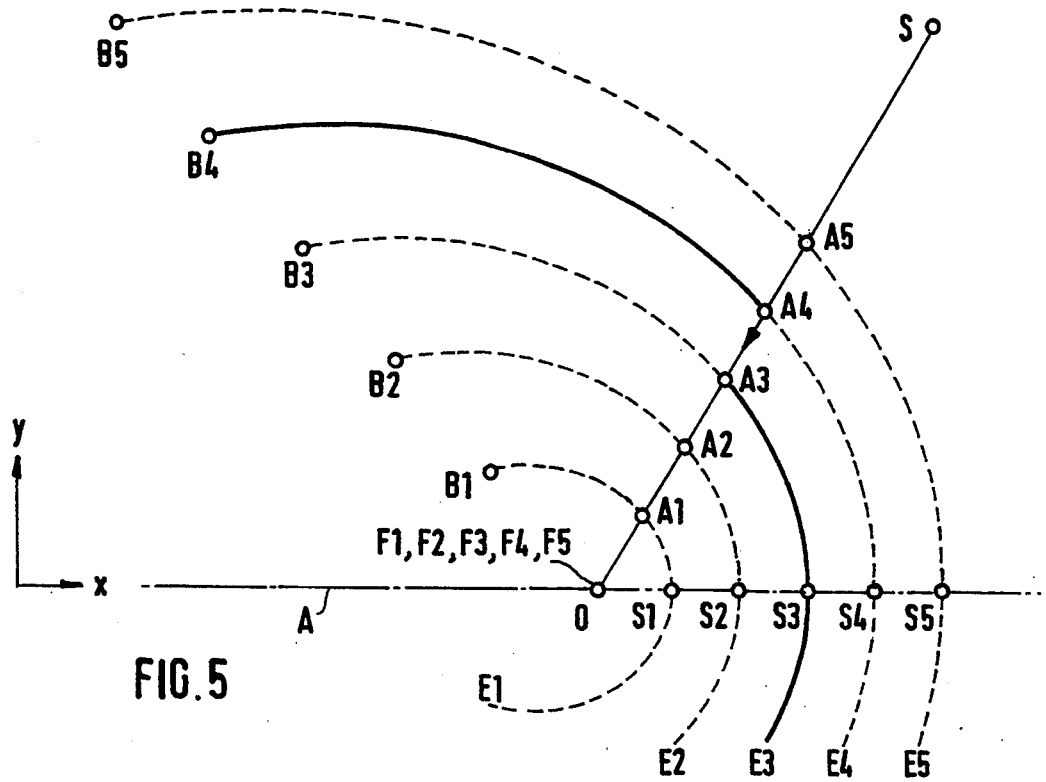
FIG. 5 shows an embodiment corresponding to FIG. 4, the reflector curve of intersection being formed by means of ellipses.

FIG. 5 shows the application of the construction principle using ellipses as the starting conics.

FIG. 5 presents ellipses E1, E2, E3, E4, and E5 arranged in such manner with respect to a common longitudinal axis A that their first foci F1, F2, F3, F4, and F5, respectively, all coincide in the point of origin 0 of a system of polar coordinates. A polar straight line 0-S intersects the ellipses at points A1 to A5 so that the tangents at these points once more all extend in parallel. The result is another construction which is totally analogous to the one described with reference to FIG. 4, except that the parabolic segments are replaced by elliptical segments. In the case of the embodiments described with reference to FIGS. 4 and 5 two conic segments each are united directly.

FIG. 6 presents an embodiment with which a reflector curve of intersection is generated that has more than two conic segments directly joined together. Again continuous lines designate those segments which, in the end, will form the reflector curve of intersection to be generated. The construction of the reflector curve of intersection from point S3 to A3/A4 to C4 corresponds to the one illustrated in FIG. 5. From point C4 on, however, another modification is desirable in the reflector curve of intersection and it will be made by adding another segment of a different ellipse, namely segment C5-B5 of ellipse E5. The direct joining of segment C5-B5 at point C4, with the resulting identical tangents (steady differentiability) is accomplished as follows:

First, in generating the reflector curve of intersection S3-A3/A4-C4, parallel shifting is effected along the straight line 0-S so that points A3 and A4 will coincide (in accordance with the example of FIG. 5). That also shifts the foci F4, F5 of the ellipses from the previously common focal point (origin 0 of the system of polar coordinates) along the straight line 0-S to below the axis A by a distance which equals the distance between the two ellipses E4 and E5.

Also ellipse E5 is displaced until its focus F5 coincides with focus E4. During this displacement the axes A are kept parallel to each other. Thereupon a straight line S' is drawn which does not start from the origin 0 of the system of polar coordinates but instead links point C4 with the point corresponding to F4/F5 in FIG. 6. This straight line S' intersects the ellipse E5 at point C5. Next, the elliptical segment C5-B5 is moved in translatory fashion so that point C5 will travel along straight line S' until it comes to lie on point C4. With this construction, the resulting reflector curve of intersection has no edges, i.e. the tangents at point C4/C5 are identical. Translatory movement in the present case means that the tangent angles do not change.

FIG. 7 shows an embodiment with which six ellipses are used to obtain the edge-free uniting of six segments. Here the parameter ratio b/a is the same for all the ellipses used, namely 0.87. The polar angle distances are 20° at which respective different elliptical segments are joined. As the polar angle gets bigger, the curve segments have bigger parameters a and b (the parameter ratio remaining the same, as stated above). In the case of the embodiment illustrated in FIG. 4 the parameters increase from the inside towards the outside (as seen from axis A) with reference to the first ellipse in the order of 1.4 times, 1.7 times, 2.1 times, 2.5 times, and 4.2 times. FIG. 7 also illustrates the radiation distribution obtained with such a reflector. The further away from the edge (point B6) the radiation is reflected by the reflector, the further away from the second focus F1' of the first ellipse E1 does it intersect the optical axis A. This modification of the reflector provides a more homogeneous distribution of light than a pure ellipse would do.

In further modification of the embodiment shown in FIG. 7, a plurality of curve segments may be lined up, in analogy to the embodiment explained with reference to FIG. 3, in such a way that the direction of curvature changes, i.e. the points of contact between the individual segments are points of inflexion within the meaning of differential calculus.

The embodiments described above show that the reflector curve of intersection according to the invention is generated by the following steps:

(a) To begin with, a conic section curve is selected as the starting curve. This may be, for example, the conic curve which constitutes the innermost segment closest to the axis. This conic is determined under general aspects in such a way as to achieve the best possible approximation to the desired light distribution, given the existing marginal conditions (dimensions, spacings, etc.).

(b) The tangents are determined for a plurality of points at desired increments (grating) of the curve.

(c) The angles of incidence and reflection of the radiation are calculated for a plurality of points.

(d) The radiation distribution thus generated purely by calculation is represented in dependence on the polar angle. If the radiation distribution demonstrates that improvement should be looked for from a certain polar angle on, then another curve segment is joined in the reflector curve of intersection at the respective polar angle, and the radiation distribution is determined once more. This may be repeated as many times as desired until the desired radiation distribution is achieved with sufficient accuracy.

The invention is especially well suited for the case where a relatively long light source is disposed on the optical axis of the reflector and is to be concentrated to a point, if at all possible, by the reflector shape (which in the prior art would be elliptical). In the prior art, a simple ellipse is very unsatisfactory to achieve that, given the geometric dimensions of the light source. The invention permits a plurality of segments of ellipses to be united directly and edge-free, the segments being selected such that the reflection becomes greater towards the inside, as the polar angle increases. This means that the curve segments have tangents whose angle included with the axis becomes ever smaller as the polar angle increases, when compared with the starting ellipse closest to the axis.

The same method may be applied analogously with hyperbolas. In this case, too, the parameter ratio b/a is maintained constant.

The method explained above for generating reflector shapes can be developed further. This is illustrated in FIG. 8. The curve R1 shown in that figure has been generated according to what is illustrated in any one of FIGS. 1 to 7 and described with reference to them. This means that curve R1 corresponds to a direct line-up of conic segments. This curve R1 now is to be modified further. A system of polar coordinates associated with the curve R1 has its origin at 0. The polar straight line 0-S intersects the curve R1 at an angle $\alpha$ at point A. The new reflector curve of intersection to be constructed is shown by a continuous line and is determined by a so-called distance ratio k. This distance ratio k was introduced by the above mentioned European patent publ. EP 0 402 740 A2 (cf. also U.S. patent application 07/536,423) and is applied accordingly also to the embodiments to be described below. In FIG. 8 the distance ratio k is defined as follows:

$$k = 0\text{-}B/0\text{-}A,$$

wherein 0-B is the distance between points 0 and B and 0-A is the distance between points 0 and A.

Then the curve R2 is obtained by forming the product of the distance 0-A with the distance ratio k for each point of the curve R1 in the system of polar coordinates, so as to get the corresponding point of curve R2. In the embodiment shown in FIG. 8 the distance ratio k for each point of the curve is greater than 1. As the polar angle increases, the distance ratio k changes; it becomes smaller, approaching 1, as may be gathered directly from the curve illustrated. Consequently the distance ratio k can be varied as a function of the polar angle. Such functions are indicated in EP 0 402 740 A2, column 6, lines 51 to 54. They are applicable here as well.

The distance ratio k also may become smaller than 1. In modification of the embodiment according to FIG. 8, that would cause the outer curve R2 to move under the inner curve R1.

The reflector curve of intersection R2 thus arrived at does not correspond to a conic section curve. Moreover, the curves cannot be expressed analytically (no formula or equation). Yet tangents can be formed for each point of curve R2. Tangents for curve R1 are known, as explained above, because respective conic segments are used. On the other hand, also the distance ratio k is known as a function of the polar angle $\alpha$. Starting from the tangent to any desired point A of curve R1, therefore, the tangent angle can be determined at the associated point B on the polar straight line 0-S of reflector curve of intersection R2. All that is needed is to form a quotient of the differences sufficiently close to the point under examination in order to arrive at a desired approximation to the exact differential quotient.

FIG. 9 shows the radiation distribution of a reflector obtained on the basis of the reflector curve of intersection R2 by rotation about axis A. When comparing this with FIG. 7 it will be seen that the light distribution is broader on a screen arranged at right angles to the axis A and at a spacing.

FIG. 10 illustrates a modification of the embodiment according to FIG. 8. One of the curves R1 and R2, or both, according to FIG. 10 are formed by a method as shown in and described with reference to FIGS. 1 to 7. If only one of the two curves is thus generated, the other one may be a conventional conic. The point of intersection C of the new reflector curve of intersection R to be generated is determined by a distance ratio k. The distance ratio k is defined as follows:

$$k = l/L,$$

wherein l is the distance between points A and C or C and B, while L is the distance between points A and B.

If k is selected to be 1, the reflector curve R coincides with the adjacent curve, whereas with k=0 it will coincide with the other adjacent curve. Usually k will be between 0 and 1, yet k>1 or k<0 also may happen.

Furthermore, the distance ratio may be constant or vary as a function of the polar angle $\alpha$.

FIG. 10 illustrates a case with k being constant, curve R2 being a parabola, and curve R1 being a combination of a plurality of elliptical segments, the tangential angles of which become smaller, as compared to the starting ellipse close to the axis, as the polar angle increases. This reflector shape is able to produce an absolutely homogeneous distribution of light.

FIG. 11 presents another embodiment of a reflector shape generated according to the invention. This reflector is of bell shape, a shape which produces a so-called wing-like (bat wing) light distribution with which the so-called direct blinding is widely reduced. This shape of reflector is suitable above all for use in the illumination of showrooms or sales rooms. In these surroundings it is important that sufficient vertical distribution of light is achieved. That is true particularly of clothing shops where any horizontal light distribution is undesirable. Furthermore, a reflector to be used in these surroundings should be relatively long so as to avoid direct blinding by the light source.

With the state of the art it is difficult to meet both these requirements at the same time because a long elliptical reflector does not produce a bat-wing type distribution of light but rather a torpedo-like light distribution.

For this reason different curves are combined in the prior art, as shown in FIG. 12. An ellipse is selected for the front side F of the reflector. The light source is designated 0. In the rear part H of the reflector either a circular segment is used or an ellipse which is almost circular. In this manner the radiation disseminated by the light source is reflected in this part toward the front F from which it is reflected to the outside at a greater angle of reflection.

With this solution, two curves are joined with an edge in between so that a dark ring is produced in the light spot. Loss is unavoidable since approximately half the rays are reflected twice. Besides, this reflector cannot provide a broad, wing-like distribution of light. The reflector surface is given some roughing treatment, such as by hammering or sandblasting in order to make the dark ring disappear and achieve broader distribution of light. As a consequence, the radiation loss increases sharply. The scattered light can cause glare or direct blinding of the onlooker.

The bell-type reflector shape according to the invention, as shown in FIG. 11, by contrast causes one-time reflection of the rays and produces a very wide distribution of light. No dark ring is formed in the light spot due to the fact that the curve is free of edges.

It is another advantage of the bell-shaped reflector according to the invention that the light distribution can be varied easily by shifting the light source on the axis. However, the light distribution always remains wing-like (cf. points 0 and 0' in FIG. 13). It is essential with this reflector that the radiation is reflected most broadly and very intensively (cf. FIG. 11) in the shoulder portion (Sch, in FIG. 13). As the shoulder portion is located at a small distance from the light source 0, minor displacement 0—0' on the axis can cause a great change in the incident angle (cf. FIG. 13). In spite of the displacement of the light source, however, the shoulder portion always produces broad and intensive radiation so that, on the whole, the light distribution remains wing-like.

It is another advantage of this reflector that direct blinding of an observer standing at a great distance from the light source does not occur in spite of the wide angle of radiation because the radiation with the greatest angle of reflection (based on the optical axis) is reflected radiation from the shoulder portion and, therefore, indirect.

If this reflector is made rather big the apex area can be given a rough surface so as to avoid the light intensity from becoming too strong in the middle of the light spot.

A bell-shaped reflector as described above can be produced by the method according to the invention, upon fixing of the parameters of the curve as follows (cf. FIG. 14):

To begin with, a parabola and an ellipse are selected. The parameters of the ellipse should be so great that its curve in the area of the apex S is at least approximately as steep as the curve of the parabola. For reasons of simplicity, both apices may coincide. The distance ratio k is constant and is selected rather small if it is defined that $l = A - c$.

After a short piece at steep gradient, the curve of the first ellipse is continued by a curve segment of another ellipse having much smaller parameters. This other curve segment runs for a short distance only, for example for from 2° to 10° in the system of polar coordinates.

Then again another elliptical segment is added, the parameters of this ellipse being of medium value.

After the shoulder portion, the parameters of the ellipses and parabolas utilized for the curve segments are selected such that the tangents gradually begin to extend in parallel with the axis, as the polar angle of the reflector increases.

The reflector curves of intersection generated in accordance with the invention may be applied to reflectors which are rotationally symmetric as well as to groove-type reflectors.

Furthermore, the invention may be applied to reflectors which are neither of rotationally symmetric nor of groove-type design, as demonstrated in FIG. 15. FIG. 15 shows an example of such a reflector which has an oval cross section at right angles to the optical axis A. FIG. 15a is a vertical section along line I—I in FIG. 15b which in turn is a top plan view of the reflector (as seen from the direction of illumination). FIG. 15c is a section along line II—II in FIG. 15b. Such a reflector is especially well suited for use with an elongated light source L. As may be taken from FIGS. 15a to 15c, the longitudinal axis of the light source L is at right angles to the optical axis A of the reflector. This reflector can produce an almost circular light spot in spite of the elongated configuration of the light source because the rays emitted by the ends of the light source are largely reflected inwardly due to the oval cross section.

A reflector of this kind can be generated according to the invention by obtaining the section curves shown in FIGS. 15a to 15c in accordance with the invention (as described above). The reflector curves of intersection in planes perpendicular to the optical axis (FIG. 15b) are fixed such as to be elliptical, with the ellipse parameters (great and small axes) corresponding to the respective dimensions of FIGS. 15a and 15c, respectively.

By way of modifying the embodiment specified above, a reflector as illustrated in FIG. 15 also may be constructed such that those reflector curves of intersection which lie in planes including the optical axis (i.e. according to FIGS. 15a and 15c) are formed according to the invention, as before, while those reflector curves of intersection which lie in planes perpendicular to the optical axis (FIG. 15b) are determined by ellipses whose parameters are selected freely.

What is claimed is:

1. A reflector for radiation disseminated by a radiation source, said reflector having a reflector curve of intersection in a plane having a first axis comprising a plurality of adjacent conic segments, each of said plurality of conic segments having at least one end point of contact coupled to an end point of contact of an adjacent one of said plurality of conic segments, each of said plurality of conic segments having a focal point different than the focal point of an adjacent segment, wherein the coupled end points of contact of adjacent ones of said plurality of conic segments have coinciding tangents relative to the first axis in the plane.

2. The reflector of claim 1, wherein each adjacent conic segment of the plurality of adjacent conic segments has a shape corresponding to a continuous portion of a common geometric shape.

3. The reflector of claim 1, wherein the plurality of adjacent conic segments comprises at least one pair of adjacent conic segments having shapes corresponding to continuous portions of different geometric shapes.

4. The reflector of claim 1, wherein the plurality of adjacent conic segments includes at least two parabolic adjacent conic segments coupled together, said two adjacent parabolic conic segments comprising
 a first adjacent parabolic conic segment having an end point, said first adjacent parabolic conic segment having a shape corresponding to a continuous portion of a first parabola having a foci and an axis of abscissae, said continuous portion of the first parabola a length from a starting point to an end point on said first parabola,
 a second adjacent parabolic conic segment having an end point coupled to the end point of the first adjacent parabolic segment such that the coupled end points of the first and second adjacent parabolic conic segments have coinciding tangents relative to the first axis in the plane, said second adjacent parabolic conic segment having a shape corresponding to a continuous portion of a second parabola having a foci and an axis of abscissae coinciding with the foci and the axis of abscissae of the first parabola in the plane having the first axis, said continuous portion of the second parabola having a starting point on said second parabola corresponding to a point of intersection of a straight line with said second parabola, said straight line extending from the foci of the second parabola to the end point of the continuous portion of the first parabola,
 wherein the shape of the two adjacent conic segments comprising the first adjacent parabolic conic segment coupled to the second adjacent parabolic conic segment corresponds to the continuous portion of the first parabola coupled to the continuous portion of the second parabola by a translatory shifting of the continuous portion of the second parabola to the continuous portion of the first parabola.

5. The reflector of claim 1, wherein the plurality of adjacent conic segments comprises more than two adjacent conic segments having shapes corresponding to continuous portions of different geometric shapes.

6. The reflector of claim 1, wherein each adjacent conic segment of the plurality of adjacent conic segments has a shape corresponding to a continuous portion of one or more ellipses and each adjacent conic segment has a length necessary to maintain an equal axial ratio between each pair of adjacent conic segments.

7. The reflector of claim 1, wherein the plurality of adjacent conic segments further comprises a first conic segment having at least one end point and a point intersecting said first axis, said first conic section being coupled to the plurality of adjacent conic segments, wherein each of said plurality of adjacent conic segments has a length greater than each of the adjacent conic section located closer to the first conic section.

8. The reflector of claim 1, wherein the plurality of conic segments further comprises a first conic segment having at least one end point, said first conic segment having a point of intersection with said first axis and at least one end point coupled to an end point of one of the adjacent conic segments from the plurality of adjacent conic segments such that a tangent drawn relative to the first axis on the plane for each point on said plurality of adjacent conic segments forms a smaller angle with the first axis than all other tangents drawn relative to the first axis for each point on the plurality of adjacent conic segment located closer to the point of intersection of the first conic segment and the first axis.

9. The reflector of claim 1, wherein the plurality of adjacent conic segments form a bell shape having a wing-like radiation distribution for said reflector curve of intersection.

10. The reflector of claim 1, wherein said radiation source is a relatively long radiation source disposed transversely with respect to an optical axis and the reflector has an oval shaped cross section intersecting the optical axis whereby a circular light spot is produced by the reflector.

11. The reflector of claim 1, wherein each of said conic segments further comprises a focus point, and adjacent ones of said plurality of conic segments have focus points and end points of contact located on a common straight line, wherein said end points of contact of adjacent ones of said plurality of conic segments are coupled by translatory movement of one of said adjacent ones of said plurality of conic segments along said common straight line.

12. A reflector for radiation disseminated by a source, said reflector having a reflector curve of intersection in a plane having a first axis comprising an edge-free surface having a shape which is a product of a distant ratio factor and a plurality of adjacent conic segments, each of said plurality of conic segments having at least one end point of contact coupled to an end point of contact of an adjacent one of said plurality of conic segments, each of said plurality of conic segments having a focal point different than the focal point of an adjacent segment, wherein the coupled end points of contact of adjacent ones of said plurality of conic sections have coinciding tangents relative to the first axis in the plane.

13. A method of generating a reflector shape having a desired radiation distribution for a reflector curve of intersection in a plane having a first axis, which comprises:
 (a) selecting a conic segment having a determinable radiation distribution in said plane having the first axis;
 (b) determining the radiation distribution of the selected conic segment;
 (c) modifying at least one portion of the selected conic segment of which the determined radiation distribution does not coincide with the desired radiation distribution by replacing each said portion having a determined radiation distribution not coinciding with the desired radiation distribution with an additional corresponding conic segment, said additional corresponding conic segment having at least one end point coupled to an end point on an unreplaced portion of the selected conic segment such that a tangent drawn to the end point of the at least one additional corresponding segment coincides relative to the first axis in the plane with a tangent drawn to the end point of the unreplaced portion of the selected segment, said selected conic segment and said additional corresponding conic segment having different focal points; and (d) repeating steps (c) and (d) for each modified selected conic segment portion until the radiation distribution of said reflector shape coincides with the desired radiation distribution.

14. The method of claim 13 wherein the shape of the additional corresponding conic segment is derived by the additional steps of parallel displacement along a polar straight line extending from the end point of the additional conic segment to the end point of the unreplaced portion of the selected conic segment, said end points to be coupled together and said adjacent corresponding segment corresponding to a continuous portion of a geometric shape corresponding to a geometric shape of the unreplaced conic segment.

15. The method of claim 13, wherein the shape of the additional corresponding conic segment is derived from a continuous portion of a second conic segment in said plane having said first axis, said continuous portion of said second conic segment being rotated until a tangent drawn to an end point of the said continuous portion of said second conic segment is parallel to the tangent drawn to the end point of the unreplaced portion of the selected segment and said end point of said continuous portion of said second conic segment is displaced so as to be adjacently coupled to the end point of the unreplaced portion of the selected conic segment.

16. The method of claim 13, wherein the conic segment having a determinable radiation distribution selected in step (a) has a point on the first axis of the plane.

* * * * *